July 4, 1967 J. H. FARRELL 3,329,772
BINAURAL SIMULATOR
Filed Oct. 28, 1963

INVENTOR
JOHN H. FARRELL

BY Russell, Chittick & Pfund
ATTORNEY

# United States Patent Office 3,329,772
Patented July 4, 1967

3,329,772
BINAURAL SIMULATOR
John H. Farrell, Hill and Hollow Farm,
East Park, N.Y.
Filed Oct. 28, 1963, Ser. No. 319,379
3 Claims. (Cl. 179—1)

This invention relates to music amplification and reproduction systems, and more particularly to an apparatus for simulating the dimensional qualities of binaural sound.

It is common in the popular music field to employ electronic amplification and reproduction of the musical sounds created by certain instruments, as for example, electric guitars. The sound vibrations from the guitar are transformed by a pickup into electrical signals which are then amplified and fed to one or more loudspeakers. The guitar amplifier usually has one or more front panel controls for adjusting the volume and tone of the music. Recently artificial reverberation units have been added to the amplifier in an attempt to enhance the dimensional quality of the music. However, artificial reverberation did not provide the dimensional fullness and tonal depth of binaural sound.

It is well known that the human ear can locate the position of a sound source by variations in the phase and/or intensity of the sound which is incident on both ears. This ability to locate sounds by variations in phase and/or intensity is known as the binaural effect. The binaural effect and the dimensional qualities associated therewith can be utilized in the amplification and reproduction of music to create for the listener a feeling of enhanced musical realism.

It is therefore an object of the present invention to provide an apparatus for creating a pleasing cancellation and reinforcement of musical sounds to simulate the dimensional qualities of the binaural effect.

It is another object of the present invention to provide such an apparatus with a tremolo control.

It is still another object of the present invention to provide the apparatus with a means for introducing a variable amount of harmonic distortion to increase the dimensional quality and tonal characteristics of the music.

These and other objects of the invention will be apparent from the following written description and drawings in which.

Figure 1:
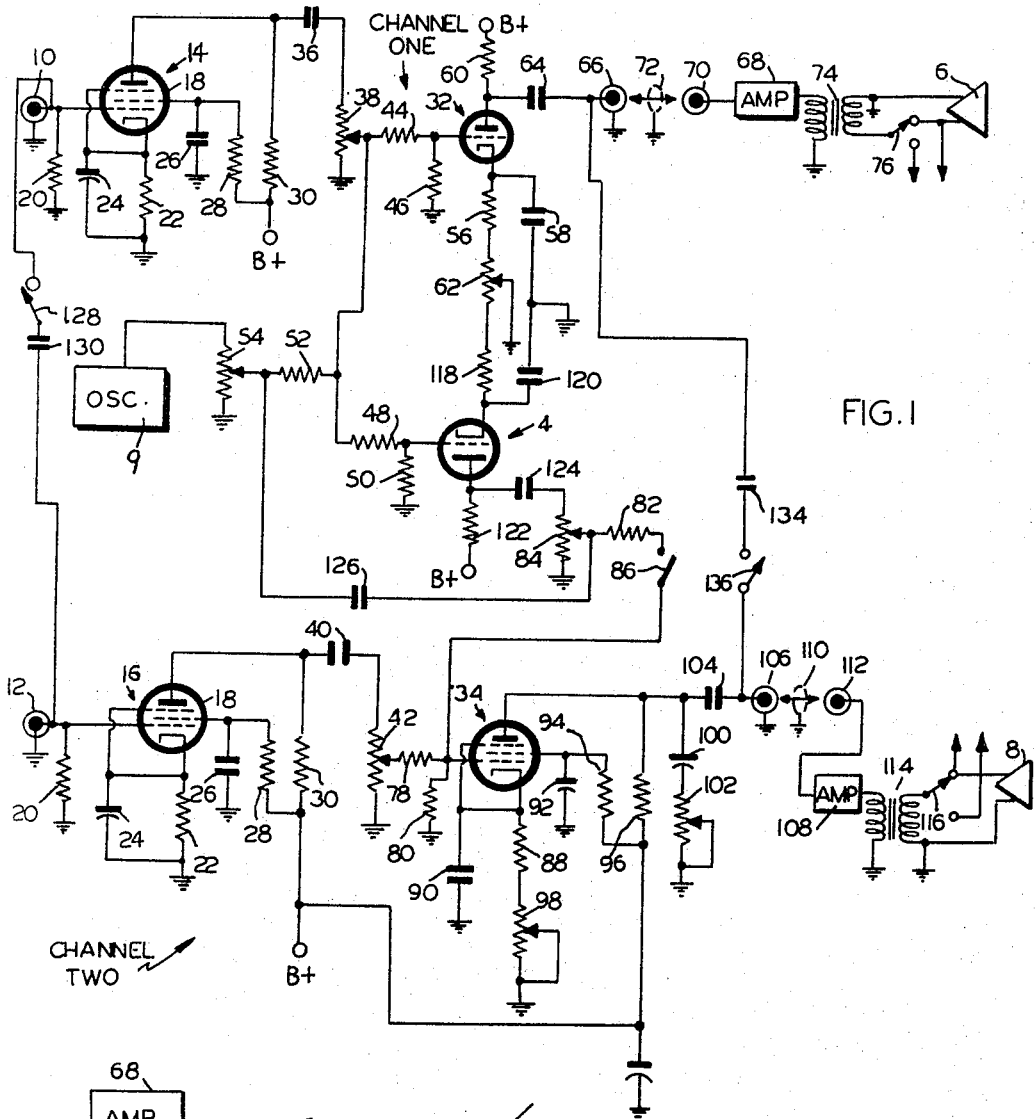
FIG. 1 is a schematic and partial block diagram of the binaural simulator.
Figure 2:
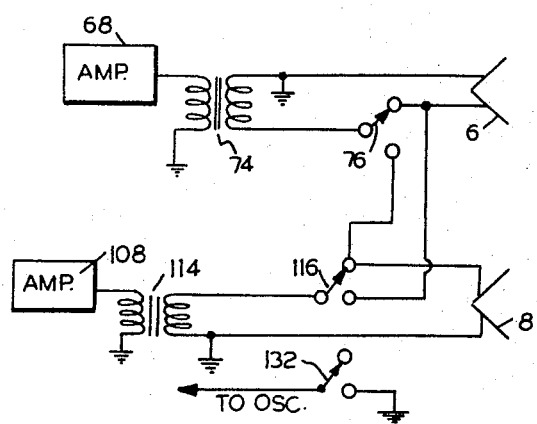
FIG. 2 is a schematic and partial block diagram of the loudspeaker and oscillator switching circuits.

Turning now to the drawings, the circuitry of my dual channel binaural simulator is shown in FIGS. 1 and 2 in schematic and partial block diagram form. It will be helpful in understanding the operation of the binaural simulator to briefly describe the major components of the simulator before discussing in detail the actual circuitry of the invention. The dual channel binaural simulator employs two substantially equivalent electrical sound transmission channels identified for purposes of clarity as channels ONE and TWO. The two channels are interconnected through appropriate circuitry, indicated generally as 4, so that first channel signals can be applied to the second channel in substantially phase opposition with respect to the straight through first channel signal. This relationship is maintained through the amplification and output stages of both channels. Since loudspeakers 6 and 8 are driven by out of phase signals from channels ONE and TWO, respectively, the loudspeakers generate equivalent phase opposed sound waves. The phase opposed sound waves from loudspeakers 6 and 8 produce a pleasing cancellation and reinforcement effect for the listener that simulates the dimensional qualities of binaural sound.

In addition to simulating the binaural phase effect, the dual channel binaural simulator also provides the musicianwith the option of introducing a tremolo or viberato in one or both of the transmission channels. The tremolo or modulation of the sound signal is produced by a selectively operable oscillator 9 coupled to either channel ONE or channels ONE and TWO depending upon the particular musical effect desired by the musician.

Having thus described the major components of my dual channel binaural simulator, I will now discuss in detail the circuitry of the invention as shown in FIG. 1. The input stages of channels ONE and TWO are identical and straightforward in their circuitry. Input jacks 10 and 12 are coupled respectively to the signal grids of conventional voltage amplifiers 14 and 16. Each amplifier consists of a pentode electron tube 18, grid leak resistor 20, cathode bias resistor 22, cathode bypass capacitor 24, screen bypass capacitor 26, screen dropping resistor 28 and a plate load resistor 30.

Appropriate filament and plate voltages are supplied to amplifiers 14 and 16 from a coventional power supply which is not shown. The same power supply also provides the necessary voltages for the other stages of the dual channel binaural simulator.

The first stage pentode amplifiers 14 and 16 are resistance-capacitance coupled to the channel ONE and TWO second stage amplifiers 32 and 34, respectively. The output from amplifier 14 is coupled through coupling capacitor 36 to the channel ONE level control potentiometer 38 while the first stage channel TWO amplified output is coupled through coupling capacitor 40 to the channel TWO level control potentiometer 42. Each of the level control potentiometers can be adjusted independently to control the output volume of the respective channel. The circuit symmetry of channels ONE and TWO terminates at this point, and hence, each channel will now be described individually.

Referring to channel ONE, the amplitude of the signal applied to the grid of the second stage amplifier 32, will theoretically depend upon the setting of the level control potentiometer 38 and the parallel-series resistance of resistors 44, 46, 48, 50, 52 and the setting of potentiometer 54. However, as a practical matter the component values are such that the signal amplitude is primarily a function of the setting of the channel ONE level control potentiometer 38. The second stage amplifier 32 consists of a conventional triode amplifier having a grid leak resistor 46, a cathode bias resistor 56, a cathode bypass capacitor 58 and a plate load resistor 60. The cathode bias for this stage can be varied by adjusting a series-connected bias set potentiometer 62 in the cathode circuit. The variable cathode bias is provided for this stage to control the operating point of the triode, and hence, the linearity of the signal amplification. The reasons for non-linear operation of this stage will be discussed subsequently. However, it is sufficient at this time to note that such operation is possible and that potentiometer 62 would normally be a front panel control for the musician.

The output from the second stage amplifier 32 is coupled through capacitor 64 to an output jack 66. If a separate amplifier 68 is employed, the output from jack 66 is fed to the amplifier input jack 70 through a suitable coaxial cable 72. Amplifier 68, output transformer 74 and the loudspeaker 6 are conventional components and therefore need not be described in greater detail. Loudspeaker switch 76 permits the output from channel ONE to be fed to either of the loudspeakers 6 and 8 as shown in FIG. 2.

Referring now to channel TWO, the output of the first stage amplifier 16 is coupled to the signal grid of the second stage amplifier 34. The amplitude of the signal will theoretically depend on the setting of the channel TWO level control potentiometer 42 and the parallel-series resistance of resistors 78, 80, 82 and the setting of potentiometer 84 (assuming that switch 86 is closed). However, as mentioned with regard to channel ONE, the amplitude of the applied signal is primarily a function of the setting of the level control potentiometer 42. The second stage amplifier 34 is a conventional pentode amplifier consisting of grid leak resistor 80, cathode bias resistor 88, cathode bypass capacitor 90, screen bypass capacitor 92, screen dropping resistor 94 and a plate load resistor 96. The cathode bias for the second stage amplifier 34 can be varied by adjusting a series-connected bias set potentiometer 98 in the cathode circuit. Potentiometer 98 controls the operating point of the pentode, and hence, the linearity of the channel TWO second stage amplifier in the same manner as previously described with respect to channel ONE bias set potentiometer 62. Bias set potentiometer 98 would normally be a front panel control together with potentiometer 62 and other controls which will be described subsequently.

The frequency response of the second stage amplifier 34 can be varied by a simple tone control circuit consisting of capacitor 100 and potentiometer 102. The tone control potentiometer 102 would normally be a front panel control for the musician.

The output from the second stage amplifier 34 is coupled through capacitor 104 to an output jack 106. A separate amplifier 108 is connected to the channel TWO output jack 106 by means of coaxial cable 110. Amplifier 108, output transformer 114 and loudspeaker 8 are off-the-shelf items and correspond respectively to the channel ONE amplifier 68, transformer 74 and loudspeaker 8. Loudspeaker switch 116 is provided to connect ether loudspeaker 6 or 8 to the channel TWO amplifier.

It should be understood that the separate amplifiers and coaxial cables depicted in FIG. 1 are merely illustrative of one possible circuit configuration and should not be construed as a preferred embodiment of the invention. The dual channel binaural simulator, including the channel ONE and TWO power amplifiers, can be constructed on a single chassis without departing from the spirit of the invention.

The channel ONE and TWO signal transmission channels described above are essentially straight through amplifier chains and as such will amplify and reproduce any signals applied to the respective input jacks. However, the two channels are also inter-connected through an amplifier stage 4 which produces the multiple signal paths and phase relationships required for the simulation of the binaural phase effect. Referring to FIG. 1 and specifically the channel ONE level control potentiometer 38, is can be seen that the output signal from the channel ONE first stage amplifier 14 follows two signal paths i.e., to the second stage amplifier 32 and to the inter-connecting amplifier 4. The amplitude of the signal applied to the grid of the inter-connecting amplifier 4 will theoretically depend upon the setting of the channel ONE level control potentiometer 38 and the parallel-series resistance of resistors 44, 46, 48, 50, 52 and the setting of the oscillator level control potentiometer 54. However, as mentioned previously, the amplitude of the applied signal is primarily a function of the setting of the channel ONE level control potentiometer 38, and therefore, if the series resistance of resistors 44 and 46 is the same as the total resistance of resistors 48 and 50, equal amplitude signals will be applied to the grid of both the channel ONE second stage amplifier 32 and the inter-connecting amplifier 4. The inter-connecting amplifier 4 is a conventional triode amplifier having a variable cathode resistance consisting of fixed cathode resistor 118 and the series-connected bias set potentiometer 62 shunted by a cathode bypass capacitor 120. The output from the inter-connecting amplifier 4 is taken from the plate load resistor 122 through a coupling capacitor 124 and appears across the inter-connecting level control potentiometer 84. The setting of potentiometer 84 determines the amplitude of the channel ONE signal applied to the signal grid of the channel TWO second stage amplifier 34 through the path provided by resistor 82 and switch 86. It also controls the amount of feedback signal applied to the grid of the inter-connecting amplifier 4 through feedback capacitor 126.

It is important to note at this time the phase relationship between the channel ONE signal applied to the channel TWO second stage amplifier 34 and the straight through channel ONE signal. Assuming that a signal is applied to input jack 10, the signal will be inverted by the first stage amplifier 14 and coupled to the grids of the channel ONE second stage amplifier 32 and the inter-connecting amplifier 4. At this point both signals are in phase. However, the inter-connecting amplifier 4 inverts the signal so that the first channel signal applied to the channel TWO second stage amplifier 34 is in substantially phase opposition to the channel ONE signal at the grid of the channel ONE second stage amplifier 32. The outputs from amplifiers 32 and 34 are also substantially phase opposed and since amplifiers 68 and 108 have the same number of signal inversion stages, the phase relationship established by the inter-connecting amplifier 4 will remain constant thereby driving loudspeakers 6 and 8 out of phase. The out of phase sound waves from loudspeakers 6 and 8 produce the pleasing cancellation and reinforcement effect mentioned previously and simulate for the listener the dimensional qualities of binaural sound.

In the above discussion it was assumed that an electrical signal had been applied only to the channel ONE input jack 10. Note, however, that the inputs of both channels can be paralleled by means of an input inter-connecting switch 128 and a coupling capacitor 130. If switch 86 is also closed, a controlled portion of the channel ONE signal will be fed into channel TWO in substantially phase opposition with respect to both the channel ONE signal and the channel TWO signal from the first stage amplifier 16. In other words the channel ONE and TWO signals have gone through one stage of inversion i.e., in amplifiers 14 and 16, respectively, while the inter-connected first channel signal has been inverted twice; first, by amplifier 14, and then by the inter-connecting amplifier 4.

The mixing of the out of phase signals in the channel TWO second stage amplifier 34 produces an electrical cancellation and reinforcement of the channel TWO signals. The mixed channel ONE and TWO signals are converted into sound waves by loudspeaker 8 which beat with the straight through channel ONE sounds from loudspeaker 6. The electrical mixing of first and second channel signals in channel TWO amplifier 34 and the subsequent phase differences between the sound waves from loudspeakers 6 and 8 produce a different simulated binaural effect from the previously described mode of operation wherein two out of phase channel ONE sound waves from loudspeakers 6 and 8 beat against each other. Both modes of operation are readily available to the musician since either mode can be selected merely by opening or closing switches 128 and 86. These switches would normally be mounted as front panel controls along with the level control potentiometers 38 and 42 which control the relative output intensities of channels ONE and TWO, respectively.

In addition to the simulated binaural sound produced by the modes of operation described above, the dual channel binaural simulator provides the musician with a variety of other musical effects which can be employed either alone or in conjunction with the simulation of binaural sound. Frist, the musician can control the frequency range of the channel TWO output by varrying the frequency response of the second stage amplifier 34 through an adjustment of the tone control potentiometer 102. Secondly, the musician can introduce a variable amount of harmonic distortion in either or both the transmission channels. The generation of harmonic frequencies is accomplished in both channels by operating one of the channel amplifier stages on the non-linear portion of the tube's characteristic curve. In channel ONE, the cathode bias on the second stage amplifier 32 is varied by adjusting the bias set potentiometer 62 to shift the operating point to the non-linear portion of the curve. In a similar manner, the operating point for the channel TWO second stage amplifier 34 is shifted by adjusting the setting of the cathode bias potentiometer 98. These adjustments are of course independent of the particular mode of operation of the dual channel binaural simulator and can be used in conjunction with any of the other musical effects produced by the simulator.

In addition to the two basic modes of binaural operation and the sound controls described in the preceding paragraph, the musician also has the option of adding a tremolo effect to one or both of the channels. The tremolo is produced by modulating the sound signals in one or both channels with the signals produced by the oscillator 9. The oscillator 9 is shown in FIG. 1 in block diagram and can be wired in accordance with any one of the well known oscillator circuits. The oscillator frequency and the shape of the output waveform are determined by the circuitry of the oscillator and would normally be fixed. However, the frequency and shape of the output waveform can be varied by well known means with a concomitant change in the modulation effect.

The oscillator output is coupled through potentiometer 54 to the input of the channel ONE second stage amplifier 32 and through the circuitry of the inter-connecting amplifier 4 and switch 86 to the signal grid of the channel TWO second stage amplifier 34. The amplitude of the oscillator signal applied to channels ONE and TWO is controlled by the setting of the oscillator control potentiometer 54. Although the oscillator 9 is depicted as being permanently coupled to channel ONE, it is obvious that suitable switching means can be employed to selectively connect the oscillator to channel ONE. The oscillator 9 is selectively operable and is activated by applying a ground to the oscillator cathode through switch 132 as shown in FIG. 2.

Referring now to FIG. 2, the control switching circuits for loudspeakers 6 and 8 are shown therein. Loudspeaker switches 76 and 116 permit each loudspeaker to be operated by either of the channel ONE and TWO amplifiers 68 and 108, respectively.

Although the discussion so far has assumed a separate amplifier for each channel either on one chassis or individual chassis, the binaural simulator can also be fed into a single amplifier. Coupling capacitor 134 and switch 136 are provided to tie the output jacks together so that the output can be taken from either of the output jacks 66 or 106. Since the listener in this case will hear sounds generated by only one loudspeaker, the binaural phase effect will not be present. However, the phase reversal blending of channel ONE and TWO signals will still be apparent as long as switch 86 remains closed.

It is obvious that other variations and modifications of the disclosed invention will become apparent to those skilled in the art. For example, injection of the oscillator signal can be made at other points in the amplifier chain and the degree and amount of phase inversion of the inter-connected signal can be varied by well known means. In addition two separate sound sources can be individually fed to input jacks 10 and 12 to provide a blending of two different types of musical instruments. It is obvious that the electrical effects produced by the dual channel amplifier can also be achieved from a completely transistorized circuit.

Having thus described and disclosed the preferred embodiments of my invention, what I claim as new and desire to secure by Letters Patent of the United States is:

1. In a music amplification and reproduction system, a binaural simulator comprising: first and second signal channels having amplification stages therein; loudspeaker means coupled to each of said channels; means for applying substantially the full frequency range of the first channel signals to said second channel in substantially phase opposition; and means for selectively introducing harmonic distortion in said channels.

2. A binaural simulator according to claim 1 wherein said means for introducing harmonic distortion comprises: an electron tube amplification stage and means for varying the cathode bias of said electron tube whereby an operating point can be selected on the curved portion of the tube characteristic.

3. In a music amplification and reproduction system, a binaural simulator comprising: a first and second signal channels having amplification stages therein; switch means for selectively inter-connecting the inputs of said channels; loudspeaker means coupled to each of said channels; selectively operable oscillator signal means coupled to said first channel; means for applying substantially the full frequency range of the signals from said first channel and said oscillator to said second channel in substantially phase opposition; and means for selectively introducing harmonic distortion in said channels.

References Cited
UNITED STATES PATENTS

| | | | |
|---|---|---|---|
| 2,485,538 | 10/1949 | Rowe | 179—1 |
| 3,124,649 | 3/1964 | Pflager et al. | 179—1.3 |
| 3,162,810 | 12/1964 | Nykl | 179—1.3 X |
| 3,170,991 | 2/1965 | Glasgal | 179—1.3 |

KATHLEEN H. CLAFFY, *Primary Examiner.*

S. J. BOR, R. MURRAY, *Assistant Examiners.*